Patented Jan. 17, 1939

2,144,395

UNITED STATES PATENT OFFICE 2,144,395

METHOD AND COMPOSITION FOR THE TREATMENT OF HAY FEVER AND OTHER AIR-BORNE INFECTIONS

Sol Snyder, Far Rockaway, N. Y.

No Drawing. Application July 6, 1936, Serial No. 89,122

4 Claims. (Cl. 167—58)

This invention relates, in general, to nasal medicaments and in particular to solutions for application to the nasal and adjacent mucosa for the treatment of hay fever and other similar allergic reactions such as asthma and in the prevention of other air-borne infections.

The present status of knowledge of the general group of reactions collected under the term "hay-fever" indicates this more or less serious pathological condition to be due to certain causative agents, air-borne or otherwise, contacting the mucous surfaces of the body and setting up certain anaphylactic reactions in the particularly hypersensitive individual. These symptomatic reactions may be exhibited in mild cases by a slight coryza, or running nose and in the more severe cases besides paroxysms of sneezing, itching and congestion of the nose, sclera and conjunctiva, there may be present urticaria, erythema, gastro-intestinal disturbance and angioneurotic edema. The severity of these attacks for an individual depends upon the degree of hypersensitivity, the condition of health and the duration and degree of exposure to the various irritating causative agents.

Clinically, hay fever, may be divided into two types, the seasonal variety and the non-seasonal variety. The attacks of the seasonal variety have been traced to various air-borne pollens of plants which are inhaled and deposited on the nasal and adjacent mucosa of the hypersensitive individual. The time of maturation of these pollens divides this type of hay fever into three distinct groups. The first or spring type begins at the end of March or early April and extends to the end of May. This is due almost entirely to the pollens of trees, especially oak, elm, maple, birch and hickory. The second group, beginning at the end of May and extending to the middle of July, is caused almost entirely by the pollens of grasses and is designated as the summer type. The important pollens in this group are timothy, red top, June grass, orchard grass, sweet vernal and plantain. The third or fall type begins in the middle of August and continues until frost. The pollens of the ragweeds are mainly responsible for this group. There may be variations in the above schedule due to local, seasonal and geographical conditions.

The non-seasonal variety is generally attributed to inhalation, by the hypersensitive person, of various animal danders such as particles of horse, dog or rabbit hair, or chicken, duck or parrot feathers. Other dusts are also a causative factor such as wheat, orris, cotton seed dusts and even the grand mixture called "household dust".

A person may be sensitive to any or all of the above types in any degree of severity.

Specific protein bodies in the pollen and in the other causative agents are believed to be the active bodies responsible for the reactions caused in the hyper-sensitive individuals.

The innoculation of gradually increasing doses of extracts of the pollen, etc., is used as a treatment to reduce the severity of the hay fever attacks. There are many objections to this type of treatment. In the first place, a rather lengthy series of tests must be made in order to determine what particular sensitivity exists in the individual. Then a graduated series of innoculations are given 2–3 times a week over a period of months. The series of injections must be repeated over a period of years before any marked improvement is noted.

Aside from the disagreeable feature of being stuck with a hypodermic needle 2 or 3 times a week over a period of years, other marked reactions may result. Slight overdosage may produce general urticaria, wheezing, nausea, vomiting and collapse. Death itself has been recorded. The constant pricking of the tissue by the hypodermic needle may set up reactions which cannot be predicted at this early date.

This invention seeks to avoid these serious objections by the provision of a convenient, harmless and effective method for the treatment of hay fever which consists of merely applying, preferably by spraying, a medicament, onto the mucous membrane of the upper respiratory tract.

A further object of the invention is the provision of a medicament adapted, when sprayed onto the mucosa of the upper respiratory tract, to alleviate or prevent the characteristic attacks of hay fever.

I have found that if a solution of an enzyme is sprayed onto the nasal mucosa and adjacent mucous membrane of a hypersensitive individual that attacks of hay fever may be prevented or relieved.

Since the sensitivity of hypersensitive individual is highly specific, the individual reacts to only the particular irritating substance causing the attack. The enzyme very likely breaks down these irritating substances into low-molecular weight, non-specific, non-irritating decomposition products which provoke no reaction on absorption.

I have used, with very good results a 2% aqueous solution of papain. Another enzyme which may be used is pancreatin dissolved in water.

I prefer, however, to use these enzymes in the presence of a vaso-constrictor such as ephedrine, or its salts or mixtures of the ephedrine base and its salts. The presence of this agent helps the penetration of the medicant into the nasal passages and also acts in a buffer capacity to keep the pH at an optimum. Other vaso-constrictors may be used, such as the various synthetic analogues of ephedrine or adrenalin.

I also prefer to include a small proportion of a hygroscopic agent such as glycerine to keep nasal mucosa moist. If the medicament is to be kept for any length of time a small quantity of an antiseptic must be added to prevent mold growth.

A typical formula employed is as follows:

| | Parts by weight |
|---|---|
| Papain | 2 |
| Ephedrine HCl | 1 |
| Glycerine | 5 |
| Oxy quinoline sulphate | 0.005 |
| Water | 100 |

A small proportion of ephedrine alkaloid may be added in place of some of the ephedrine salt in order to obtain a faintly alkaline reaction which approaches the optimum pH for the action of the enzyme.

This formula gives excellent results when sprayed into the nose. If the nose is clogged the medicant should be sprayed in and patient instructed to wait about 5 minutes until the mucosa shrinks and opens the upper nasal passages. The spray is again used and the entire nasal and pharyngeal mucosa covered with the medicament. Any air-borne pollen or other specific irritant if breathed will deposit on this moist mucosa containing the enzyme and be detoxified. I have found that the addition, to the above formula, of a small percentage of an amylolytic enzyme such as diastase or taka-diastese aids materially in increasing its efficiency. This may be due to either an effect on the specific causative agents themselves or an effect on the nasal mucins or other gluco proteins thereby permitting the proteolytic enzymes to penetrate more thoroughly and work easier. Which of these two hypothesis is correct is not known, since the actual chemical composition of the specific causative agents is unknown. In this connection it may be mentioned that pancreatin alone may be substituted in the above formula to obtain the combined proteolytic and amylolytic (and possibly lipolytic) enzyme effect.

The term "air-borne infections" as used in the specification and claims is meant to include hay fever, coryza and any other virus disease which may respond to the type of treatment disclosed in this patent.

The various enzymes cited above and the proportions used are mentioned for illustrative purposes only, and this patent is to be in no way construed as limited thereto. Any enzyme from any source which has the property of digesting and detoxifying the various irritant or infectious materials may be used. The proportions of the various enzymes used may also be varied over a considerable range of concentrations.

I have also found that the use of this enzymic nasal medicament tends to diminish the susceptibility of an individual to the common cold. This infection is attributed to an air-borne filterable virus. The treated mucosa probably detoxifies this virus in a manner similar to its action in the above allergic cases. It has also been used with success in preventing the transmission of various air-borne diseases.

I claim:

1. As a new composition of matter for the treatment of hay fever a nasal medicament comprising a solution of a proteolytic enzyme and a vaso-constrictor.

2. As a new composition of matter for the treatment of hay fever, a liquid comprising an aqueous solution of papain and ephedrine.

3. As a composition of matter a nasal medicament for the treatment of hay fever, containing proteolytic enzymes having the property of detoxifying air-borne materials which cause allergic reactions in hypersensitive individuals.

4. As a composition of matter a medicament for the treatment of hay fever, containing proteolytic enzymes.

SOL SNYDER.